United States Patent [19]
Staudenmaier et al.

[11] 3,989,127
[45] Nov. 2, 1976

[54] HYDRODYNAMIC BRAKE SYSTEM

[75] Inventors: Gerhard Staudenmaier, Konigsbroon-Zang; Berthold Herrmann, Heidenheim (Brenz); Hein Hellwig, Steinheim, all of Germany

[73] Assignee: J. M. Voith GmbH, Heidenheim, Germany

[22] Filed: Feb. 21, 1975

[21] Appl. No.: 551,840

[30] Foreign Application Priority Data
Feb. 23, 1974  Germany............................ 2408876

[52] U.S. Cl. ................................ 188/296; 60/347; 188/181 C
[51] Int. Cl.² ...................................... F16D 57/02
[58] Field of Search................ 188/290, 296, 181 C; 303/3, 7; 60/347, 330

[56] References Cited
UNITED STATES PATENTS

| | | | |
|---|---|---|---|
| 2,750,009 | 6/1956 | Pohl..................................... | 188/296 |
| 3,512,616 | 5/1970 | Bessiere............................... | 188/296 |
| 3,774,734 | 11/1973 | Forster et al. ....................... | 188/296 |
| 3,860,097 | 1/1975 | Braschler et al...................... | 60/330 |
| 3,863,739 | 2/1975 | Schaefer et al. ..................... | 188/296 |

FOREIGN PATENTS OR APPLICATIONS

| | | | |
|---|---|---|---|
| 1,521,005 | 3/1968 | France................................. | 188/296 |
| 482,428 | 3/1938 | United Kingdom.................. | 188/290 |

*Primary Examiner*—Trygve M. Blix
*Assistant Examiner*—Edward R. Kazenske
*Attorney, Agent, or Firm*—Michael J. Striker

[57] ABSTRACT

A hydrodynamic brake system wherein the extent to which the working chamber between the rotor and stator is filled with braking liquid is regulated by a valve which is adjustable by a measuring device having an overflow line communicating with two spaced-apart portions of the working chamber and containing two flow restrictors. The end portions of the overflow line are positioned in such a way that a continuous stream of liquid flows through the overflow line when the rotor is driven. At least one of the flow restrictors is adjustable so as to insure that the pressure of liquid in the overflow line between the flow restrictors is indicative of the real braking action of the system. Such pressure is used for adjustment of the valve to thus insure that the extent to which the working chamber is filled varies in response to changes in rotational speed of the rotor so as to guarantee a reproducible progress of the braking action.

10 Claims, 4 Drawing Figures

HYDRODYNAMIC BRAKE SYSTEM

BACKGROUND OF THE INVENTION

The present invention relates to improvements in hydrodynamic retarder or brake systems for the wheels of locomotives and other automotive vehicles or other rotary parts. More particularly, the invention relates to improvements in hydrodynamic brake systems of the type wherein a rotary blade ring (hereinafter called rotor) cooperates with a stationary blade ring (hereinafter called stator) to define a toroidal working chamber for a suitable braking liquid (e.g., a non-volatile lubricant) and wherein the rate at which the braking action varies (the variation may be zero) in response to changes in rotational speed of the rotor can be regulated in dependency on deviations of rated value of the braking action from the real braking action, the latter being dependent on the extent to which the working chamber is filled with braking liquid. The rotor receives torque from the wheel of an automotive vehicle or from another rotary part which requires braking.

The braking action of a hydrodynamic brake system increases with the square of the rotor speed when the extent to which the working chamber is filled with liquid remains unchanged. The curve which is indicative of the increasing braking action is a parabola, and this curve is steeper if the liquid fills a relatively large portion of the working chamber. It is already known to provide a hydrodynamic brake system with means for changing the extent to which the working chamber is filled with braking liquid in response to changing RPM of the rotor in order to insure that the curve representing the rate at which the braking action varies in response to changing RPM of the rotor deviates from a parabola. Depending on the intended use of the brake system, the rate at which the working chamber is filled with braking liquid can be regulated in such a way that the curve which is plotted in a rectangular coordinate system to indicate the changes in braking action in response to changing RPM of the rotor slopes upwardly or downwardly or constitutes a horizontal line.

FIG. 3 in the article written by Helmut Müller and appearing on pages 203-207 of "Eisenbahntechnische Rundschau" (Volume 5, 1971, special reprint by Voith-Druck G 693/6. 71, Heidenhelm/Brenz, Western Germany) shows a hydrodynamic brake system wherein the means for regulating the extent to which the working chamber is filled with liquid comprises a spill or overflow valve having a reciprocable valve member one end face of which is subjected to the variable pressure of a gaseous fluid whereby such pressure represents the rated or desired braking action. Another end face of the valve member in the spill valve is acted upon by a liquid whose pressure is indicative of the RPM of the rotor as well as of the extent to which the working chamber is filled with liquid, i.e., of the real braking action. The valve member "compares" the two pressures and effects a change in the extent to which the working chamber is filled with liquid when the rated pressure deviates from the pressure of liquid. Thus, when the rated pressure remains constant and the RPM of the rotor increases, the pressure of liquid increases for an interval of time so that the valve member leases its position of equilibrium by moving in a first direction and temporarily opens an outlet port which allows liquid to escape from the working chamber whereby the liquid pressure acting upon the valve member decreases and the latter moves back toward its neutral position. When the RPM of the rotor decreases, the valve member again leaves its neutral position (but moves in the opposite direction) to temporarily open a port which admits additional liquid into the working chamber whereby the pressure of liquid upon the valve member increases and the latter again returns to its neutral position. Thus, the pressure of liquid upon the valve member can temporarily deviate from that pressure which is needed to counteract the pressure of gaseous fluid in order to maintain the valve member in the neutral position; however, the average value of liquid pressure remains unchanged as long as the pressure of gas (rated value) remains unchanged.

The manner in which the braking action progresses in response to changes in RPM of the rotor depends on the manner in which the pressure of liquid acting upon the valve member in the spill valve varies as a function of changes in RPM of the rotor for a predetermined or preselected progress of braking action. It is simpler to examine the relationship between the liquid pressure changes and the changes in RPM of the rotor for a constant or unvarying braking action, e.i., when the curve representing the progress of the braking action at different rotational speeds of the rotor is a horizontal line. As stated above, the parameter which is used to indicate the real braking action may be the pressure of liquid, and such liquid may be that which is evacuated from the working chamber of the brake system. The pressure of this liquid rises when the RPM of the rotor increases while the braking action remains unchanged; therefore, if the pressure of liquid is maintained at a constant value (by the aforementioned regulating means), the braking action must decrease in response to increasing rotational speed of the rotor. However, if one insures that the liquid pressure decreases in response to increasing rotational speed of the rotor (again, while the braking action remains unchanged), the regulating means insures that the system produces a braking action which increases in response to increasing RPM of the rotor. Finally, the extraordinary event that the pressure of liquid remains constant at a varying RPM of the rotor and while the braking action remains unchanged, the regulating means insures that the curve representing the progress of braking action is a horizontal line.

If one wishes to control the progress of braking action in a given hydrodynamic brake system, it is necessary to provide a unit which is capable of controlling the pressure of liquid acting upon the valve member of the spill valve in such a way that such pressure is representative of the real or momentary braking action of the brake system. In other words, such unit (hereinafter called measuring device) must insure that the pressure of liquid progresses in a manner which is necessary to maintain a constant braking action at different rotational speeds of the rotor. The present invention is concerned with a novel and improved measuring device and with a hydrodynamic brake system which embodies the novel measuring device.

In the brake system which is described in the aforementioned article by Müller, the measuring device comprises a pressure reducing valve having a control piston and a differential piston, the latter serving to displace the control piston whereby the control piston changes the pressure of liquid which acts upon the valve member of the spill valve. An end face of the differential piston is subjected to the pressure of a liquid whose pressure equals that in a selected portion of the housing of the brake system and which is supplied by a first metering conduit. The differential piston has an annular shoulder whose area is smaller than that of the end face and which is subjected to the pressure of hot liquid that is being evacuated from the working chamber of the brake system and is admitted into the body of the pressure reducing valve by a second metering conduit. Thus, the differential piston is acted upon by two liquids and the pressure of each of these liquids depends in a different way from the rotational speed of the rotor. The second metering conduit contains two flow restrictors one of which is installed immediately upstream of the discharge end of a small pipe communicating with the second metering conduit and the other of which is installed immediately upstream of the point of communication between the pipe and the second metering conduit. The flow restrictors render it possible to reduce the pressure of liquid which flows toward the shoulder of the differential piston. The rate at which the pressure varies in response to changing RPM of the rotor at a constant braking action can be regulated by changing the ratio of the effective areas of the end face and shoulder on the differential piston and (to a certain extent) by adjusting the aforementioned flow restrictors.

In many instances, each hydrodynamic brake system of a plurality of serially produced brake systems causes the braking action to vary at a different rate even if the brake systems are identical size and are produced and assembled in the same way. Such deviations of the progress of braking action from a standard progress is probably attributable to manufacturing tolerance during casting of certain parts and during subsequent machining, especially of those housing parts and pipes through which the liquid flows when the brake system is in use. Additional deviations from a desirable standard or preselected progress of the braking action develop as a result of non-uniformity of connections between the brake system proper and the aforementioned metering conduits. Therefore, it is customary to adjust the variations of pressure differential at the opposite sides of the differential piston subsequent to completed assembly of a brake system by adjusting the aforementioned flow restrictors. However, it is not unusual that the actual variation of pressure at different rotational speeds of the rotor (and while the braking action remains constant) deviates from the desired variation to such an extent that it cannot be properly adjusted by the flow restrictors alone; it is then necessary to replace the differential piston with another piston wherein the ratio of the effective cross-sectional areas of the end face and shoulder differs considerably from the ratio on the removed differential piston. As a rule, a proper ratio can be found only by resorting to extensive experimentation which is time-consuming and contributes significantly to the cost of the brake system. It is not unusual that the orginally inserted differential piston must be replaced in each of a plurality of serially produced identical or nearly identical brake systems.

The situation is further aggravated if the just discussed measuring device is to be installed in differently dimensioned brake systems and/or different types of hydrodynamic brake systems. Moreover, the just discussed measuring device is not sufficiently versatile to enable the workmen to rapidly and accurately adjust the progress of the pressure in response to changing rotational speed of the rotor when it becomes necessary or desirable to change the rate at which the pressure varies in response to changing RPM of the rotor. This invariably necessitates replacement of the entire measuring device inclusive of the entire pressure reducing valve.

SUMMARY OF THE INVENTION

An object of the invention is to provide a novel and improved hydrodynamic brake system which is simpler, more reliable and less expensive than heretofore known brake systems.

Another object of the invention is to provide a brake system wherein the progress of braking action at different rotational speeds of the rotor can be selected in advance with a surprisingly high degree of reproducibility and by resorting to simple, compact and inexpensive mass-produced components.

A further object of the invention is to provide a novel and improved measuring device which can be used in a hydrodynamic brake system to control the means which regulates the extent to which the working chamber of the brake system is filled with braking liquid.

An additonal object of the invention is to provide a measuring device which can be installed in each of a plurality of serially produced brake systems of identical type and size as well as in different types of differentially dimensioned brake systems.

Still another object of the invention is to provide a measuring device which can be installed in existing as well as in new brake systems and which can furnish impulses for regulation of the extent to which the working chamber is filled with liquid, either by novel or by conventional types of valves or analogous regulating means.

The invention is embodied in a hydrodynamic brake system which comprises a stator, a rotor which is rotatable by the wheel of a locomotive or by another rotary part to be braked and defines with the stator a substantially toroidal liquid-containing working chamber wherein the pressure of liquid varies when the rotor is driven at different speeds while the extent to which the chamber is filled with liquid remains unchanged, conduit means for supplying liquid to and for evacuating liquid from the chamber, adjustable regulating means for controlling the flow of liquid in the conduit means to thus determine the extent to which the chamber is filled with liquid and hence the braking action of the system at a given RPM of the rotor, and means for adjusting the regulating means. In accordance with a feature of the invention, the means for adjusting the regulating means comprises a measuring device having an overflow line including first and second end portions (e.g., first and second ports in the casing of the stator) communicating with first and second portions of the working chamber in such a way that a continuous stream of liquid flows through the overflow line in a direction from the first toward the second end portion thereof when the rotor rotates, and first and second flow restrictors disposed in the overflow line between the first and second end portions of this line. The flow restrictors are arranged to maintain the pressuree of liquid in the overflow line intermediate the flow restrictors at a first value which is indicative of the momentary or real braking action of the system; to this end, one or both flow restrictors are adjustable to change the rate of liquid flow therethrough. The regulating means includes a valve or other suitable means for comparing the first value with a selected rated value (representing the desired braking action of the system) and for changing the quantity of liquid in the working chamber when the first value deviates from the rated value or when the difference between the two values deviates from a predetermined difference.

When the brake system is in use, i.e., when the rotor is driven to rotate relative to the stator, the liquid in the chamber circulates in a predetermined direction. The flow of liquid into the first end portion of the overflow line preferably takes place in a second direction making with the first direction (namely, with the first direction in the region of the first end portion of the overflow line) an angle of between 0° and 90°, preferably between 45° and 75°. The direction in which the liquid flows from the second end portion of the overflow line into the chamber preferably makes with the predetermined direction (in the region of the second end portion of the overflow line) an angle of between 0° and 90°, preferably between 5° and 30°.

When the rotor is driven, it causes liquid in the chamber to flow along the front surfaces of the stator blades, and such blades are preferably inclined with respect to the rotor axis. The first end portion of the overflow line preferably communicates with the deepmost portion of a pocket adjacent to the front surface of one such blade, and the second end portion of the overflow line preferably constitutes an injector which discharges liquid into the deepmost portion of a pocket which is adjacent to the front surface of another stator blade. The end portions of the overflow line are preferably parallel to the adjacent blades of the stator.

The novel features which are considered as characteristic of the invention are set forth in particular in the appended claims. The improved hydrodynamic brake system itself, however, both as to its construction and its mode of operation, together with additional features and advantages thereof, will be best understood upon perusal of the following detailed description of certain specific embodiments with reference to the accompanying drawing.

DESCRIPTION OF THE PREFERRED EMBODIMENTS

Figure 1:
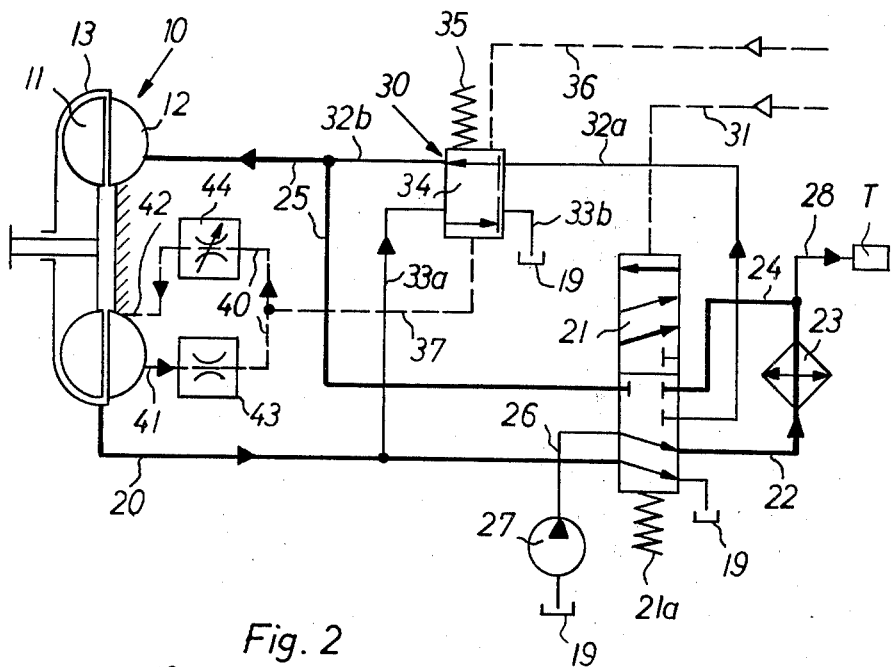
FIG. 1 is a partly sectional and partly diagrammatic view of a hydrodynamic brake system which embodies one form of the invention.

FIG. 1 shows a first hydrodynamic brake system having a rotor 11 which defines with a stator 12 a toroidal working chamber 10. The rotor 11 is surrounded by a stationary housing 13. A liquid cooling circuit includes an evacuating pipe 20, a shutoff valve 21, a second pipe 22, a heat exchanger 23 which receives hot braking liquid from the pipe 22, a third pipe 24 which receives cooled liquid from the heat exchanger 23, and a fourth pipe 25. The pipe 20 receives hot braking liquid from and the pipe 25 admits cooled braking liquid to the working chamber 10. The valve member of the shutoff valve 21 has a first or "off" position which is shown in FIG. 1 and in which the valve member is held by a spring 21a, and a second or "on" position to which the valve member is moved in response to admission of compressed air via control line 31. In the off position of the valve member in the shutoff valve 21, the pipe 20 is connected with the sump 19 and the pipe 24 is sealed from the pipe 25. Moreover, the valve 21 then connects a pipe 26 (which is connected with the outlet of a liquid circulating pump 27) to the pipe 22. When the hydrodynamic brake system is not in use, the pump 27 can supply pressurized liquid to a hydrodynamic transmission T via branch pipe 28 which is connected with the outlet of the heat exchanger 23. The inlet of the pump 27 draws liquid from the sump 19. When the line 31 admits compressed air to move the valve member of the shutoff valve 21 to the on position, the cooling circuit is completed so that the liquid circulates in the path defined by the working chamber 10, pipe 20, valve 21, pipe 22, heat exchanger 23, pipe 24, valve 21 and pipe 25. Also, the valve 21 then connects the pipe 26 with a filling conduit 32a, 32b which discharges liquid supplied by pump 27 into the pipe 25 of the cooling circuit. It is also possible to connect the filling conduit 32a, 32b directly with the working chamber 10. The conduit 32a, 32b cooperates with a liquid discharging conduit 33a, 33b to regulate the extent to which the working chamber 10 is filled with liquid. In the embodiment of FIG. 1, the liquid-receiving end of the conduit 33a, 33b is connected with the pipe 20 and the conduit 33a, 33b discharges liquid into the sump 19.

The means for regulating the braking action as a function of the RPM of the rotor 11 includes a valve 30 which is installed in the conduits 32a, 32b and 33a, 33b in such a way that it can regulate the flow of liquid from the conduit portion 32a to the conduit portion 32b as well as from the conduit portion 33a to the conduit portion 33b. The regulating valve 30 has a valve member 34 (hereinafter called piston) which is biased by a spring 35 to assume the end position shown in FIG. 1 when the brake system is not in use. The piston 34 then permits liquid to flow, at a maximum rate, from the conduit portion 32a into the conduit portion 32b; at the same time, the piston 34 seals the conduit portion 33a from the conduit portion 33b. That end face of the piston 34 which is acted upon by the spring 35 can be subjected to the pressure of a compressed gaseous fluid (normally air) which can be admitted via control line 36. The pressure of air in the line 36 can be varied at will within a desired range; such pressure is indicative of the rated or desired value of the braking action. The other end face of the piston 34 is acted upon by liquid supplied via control line 37; such pressure is indicative of the actual or measured braking action.

The pressure of liquid in the control line 37 (actual value of braking action) is determined by a novel measuring device including an overflow line 40 which conveys liquid from a first port 41 to a second port 42 of the stator 12 and contains two serially arranged flow restrictors 43, 44. The ports 41, 42 communicate directly with the working chamber 10. When the hydrodynamic brake system is in operation, i.e., when the valve member of the valve 21 is in the on position, a small quantity of braking liquid flows through the overflow line 40, i.e., from the port 41 to the port 42. The pressure of liquid between the flow restrictors 43, 44 is indicative of the real or actual braking action; therefore, the aforementioned control line 37 branches from the overflow line 40 between the flow restrictors 43, 44 and insures that the pressure of liquid at the underside of the piston 34 (as viewed in FIG. 1) is indicative of the real braking action. The pressure of liquid in the line 37 is less than the relatively high pressure at the port 41 but is normally higher than the relatively low pressure at the port 42. In other words, the pressure of liquid in the line 37 is an averaged pressure or mixed pressure, and the "mixing" ratio can be varied by adjusting at least one of the flow restrictors 43, 44, preferably the second or downstream flow restrictor 44. It can be said that the regulating valve 30 continuously compares the pressure in the line 37 with the pressure in the line 36. When the pressure of liquid in the line 37 overcomes the pressure in the line 36 plus the bias of the spring 35, the piston 34 temporarily reduces the rate of liquid flow from the conduit portion 32a to the conduit portion 32b and simultaneously increases the rate of liquid flow from the conduit portion 33a to the conduit portion 33b until the pressure in the line 37 decreases sufficiently to match that in the line 36 plus the bias of the spring 35. Inversely, the rate of liquid flow from 32a to 32b increases and the rate of liquid flow from 33a to 33b decreases when the pressure of liquid in 37 falls below the pressure of air in 36 plus the bias of spring 35. When the pressure in the line 36 plus the bias of spring matches the pressure in the line 37, the regulating valve 30 respectively seals the conduit portions 32a and 33a from the conduit portions 32b, 33b or allows a small quantity of liquid to flow from the conduit portion 32a into the pipe 25 via conduit portion 32b in order to compensate for eventual liquid losses owing to leakage.

The positions of the ports 41 and 42 are selected in such a way that the pressure of liquid in port 41 deviates from liquid pressure at the port 42 even if the rate of liquid flow in the overflow line 40 is very small. In selecting the locations of ports 41, 42, one can take advantage of eventual differences between static pressure in different portions of the working chamber profile. It requires only a minimum amount of simple experimentation to determine those portions of the outline of the working chamber 10 in which the liquid exhibits a suitable pressure in a particular type of hydrodynamic brake system. In such cases, one must take into account that, depending on the configuration of ports, the pressures in the ports will be distorted to a smaller or greater extent.

In accordance with a presently preferred embodiment of the invention, the directions in which the liquid flows in the region of the ports 41, 42 are selected in such a way that the liquid is caused to circulate through the overflow line 40 owing to kinetic energy of liquid flowing into the port 41 and/or owing to suction in the region where the port 42 discharges liquid into the working chamber 10. This insures that the liquid pressure upstream of the first flow restrictor 43 is relatively high and that the pressure of liquid downstream of the second flow restrictor 44 is relatively low; otherwise, there would be no flow of liquid from the port 41 toward the port 42.

The measuring device 40–44 is extremely simple, compact, inexpensive and reliable. This measuring device operates as follows:

When the hydrodynamic brake system is on, the pressure of liquid in the overflow line 40 between the port 41 and the first flow restirctor 43 is relatively high. The exact value of such pressure depends, among others, on the speed at which the liquid flows in the working chamber, i.e., on the RPM of the rotor 11. Consequently, the speed of liquid flow and the pressure of liquid in the overflow line 40 upstream of the flow restrictor increases in response to increasing RPM of the rotor 11 in the housing 13. It has been found that the pressure of liquid in the line 40 (between 41 and 43) increases with increasing RPM of the rotor 11 even if the brake system is mounted on a test stand for the purpose of examining the operation of the brake system and the braking action is maintained constant by appropriate reduction of the extent to which the working chamber 10 is filled in the liquid. Otherwise stated, the liquid pressure in the overflow line 40 between 41 and 43 increases more or less steeply when the RPM of the rotor 11 increases even though the extent to which the working chamber 10 is filled with liquid is reduced in order to insure that the braking action will remain constant.

A relatively low liquid pressure prevails in the overflow line 40 between the flow restrictor 44 and port 42. Such pressure is invariably sufficiently less than in the region of the port 41 in order to insure that a continuous stream of liquid will flow from the port 41 toward the port 42. As a rule, the rise of liquid pressure between the flow restrictor 44 and port 42 will be much less pronounced than that at the port 41 when the RPM of the rotor 11 increases while the braking action remains constant; in some instances, the liquid pressure in overflow line 40 between 44 and 42 will not rise at all or will actually decrease even if the RPM of the rotor 11 increases to increase the liquid pressure at the port 41.

The measuring device 40–44 "mixes" the pressure of liquid in the overflow line 40 upstream of the flow restrictor 43 with the pressure of liquid in the line 40 downstream of the flow restrictor 44, i.e., the device 40–44 furnishes a single pressure which can be utilized to adjust the position of the piston 34 in the regulating valve 30. The single pressure is less than the pressure at the port 41 but exceeds the pressure at the port 42 while the RPM of the rotor 11 varies and the braking action remains constant. The single pressure develops in the overflow line 40 in the region between the flow restrictors 43, 44 and such single pressure can be varied in response to changing RPM of the rotor 11 in a number of ways by adjusting at least one of the flow restrictors 43, 44. In one of two extreme situations, the single or "mixed" pressure in the line 40 between the flow restrictors 43, 44 varies (in response to changing RPM of the rotor 11) at the same rate as the pressure which prevails upstream of the first flow restrictor 43; in the other extreme situation, the pressure in line 40 between 43, 44 varies at the same rate as the liquid pressure downstream of the second flow restrictor 44. A large number of intermediate rates of liquid pressure changes can be selected between these extreme values. The pressure in the line 40 between the flow restrictors 43, 44 is used to adjust the position of the piston 34 of the regulating valve 30 in a manner as shown in FIG. 1, i.e., by connecting the line 40 with the control line 37 which latter admits liquid directly into the corresponding chamber of the valve 30, or in another suitable way. For example, the portion of the line 40 between the flow restrictors 43, 44 can be connected with a suitable electro-hydraulic transducer which transmits electric signals serving to effect adjustments in the position of the piston 34 when the intensity of another characteristic of such signals indicates that the pressure of liquid in the line 40 between the flow restrictors 43, 44 is indicative of a braking action other than the desired braking action (air pressure in the control line 36).

An important advantage of the measuring device 40–44 is that its overflow line 40 communicates directly with the working chamber 10. This insures that the rate at which the pressure of liquid in the control lines 37 of each of a series of identical hydrodynamic brake systems (and even in the control lines 37 of differently dimensioned brake systems) varies at a rate which is more accurately reproducible than in heretofore known brake systems. It has been found that the influence of eventual manufacturing tolerances upon the accuracy of the measuring device 40–44 is negligible or much less pronounced than in heretofore known brake systems. Moreover, the improved measuring device can dispense with the complex, sensitive and expensive differential pressure valves which are used in the aforedescribed conventional brake system to control the means which regulate the braking action. The improved measuring device can be assembled of a small number of simple components which can be used irrespective of the differences in the size and/or other features of brake systems employing the improved measuring device.

Figure 3:
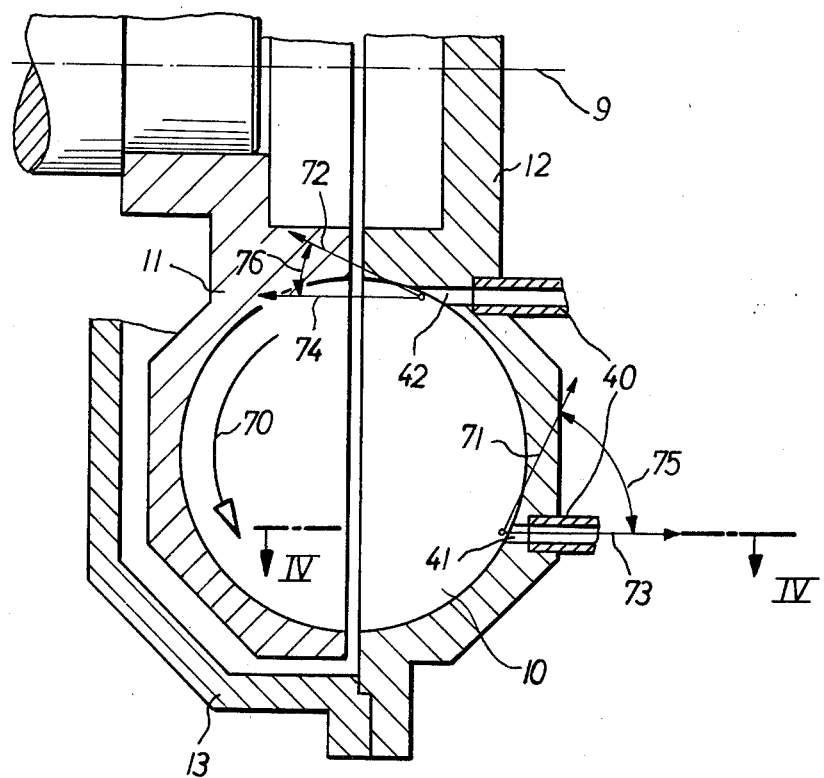
FIG. 3 is an enlarged sectional view of a detail in the brake system of FIG. 1, the section being taken in the direction of arrows as seen from the line III—III of FIG. 4.
Figure 4:
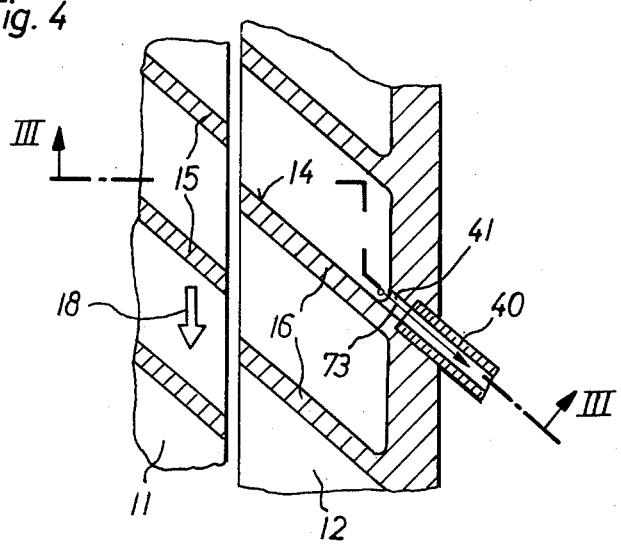
FIG. 4 is a fragmentary sectional view as seen in the direction of arrows from the line IV—IV of FIG. 3.

FIGS. 3 and 4 show the presently preferred manner of arranging the ports 41 and 42 for the overflow line 40 in the stator 12 of the hydrodynamic brake system. The cross-sectional outline of the working chamber 10 is preferably circular; in this chamber, the braking liquid flows in the direction indicated by arrow 70. The direction of liquid flow in the region where the port 41 receives liquid from the chamber 10 is indicated by the arrow 71, and the direction in which the liquid flows in the chamber 10 in that region where the port 42 discharges liquid into the interior of the stator 12 is indicated by the arrow 72. The arrows 73 and 74 respectively indicate the direction of liquid flow into the line 40 and the direction of liquid outflow from the line 40. The directions indicated by arrows 73 and 74 are arranged in planes being parallel to the axis 9 of rotation of the rotor 11 in the housing 13. This, however, is of no particular importance for the operation of the measuring device 40–44. It is much more important to properly select the angles 75 and 76 between the directions indicated by the arrows 71, 73 on the one hand and the directions indicated by the arrows 72, 74 on the other hand. These angles determine whether or not a continuous liquid stream will flow through the overflow line 40 from the port 41 to the port 42 and through the flow restrictors 43, 44 when the hyrodynamic brake system is on. It has been found that the angle 75 in the region of the first port 41 should be an angle of more than 0° but not more than 90° (preferably between 45° and 75°), and that the angle 76 in the region of the port 42 should also be between 0° and 90° (preferably between 5° and 30°).

FIG. 4 shows the blades or vanes 16 of the stator 12 and the blades or vanes 15 of the rotor 11. It will be noted that these blades are inclined with respect to the axis 9 of the rotor 11. The arrow 18 indicates the direction of movement of the rotor 11, thus, the braking liquid which is circulated in the chamber 10 in response to rotation of the rotor 11 flows against the "front" sides or surfaces 14 of the stator blades 16. The port 41 is adjacent to the root portion of a stator blade 16 at the front side or surface 14 of such blade. That portion of the overflow line 40 which is immediately adjacent to the port 41 is preferably parallel to the nearest blade 16. Otherwise stated, the direction indicated by the arrow 73 of FIG. 3 is parallel to the adjacent blade 16.

The second port 42 (not shown in FIG. 4) also communicates with the working chamber 10 in a region which is adjacent to the front surface 14 and to the root portion of the nearest blade 16.

The disposition of ports 41, 42 in a manner as described in connection with FIG. 4 insures that a continuous stream of liquid will flow through the line 40 even if the extent to which the working chamber 10 is filled with liquid is greatly reduced, i.e., if the liquid fills the interior of the stator 12 only in the regions which are adjacent to the front surfaces 14 of the blades 16. Consequently, the measuring device 40–44 will operate reliably when the chamber 10 is practically filled with braking liquid as well as when the liquid fills only a small portion of this chamber.

The feature that the portions of the line 40 which are immediately adjacent to the ports 41, 42 are parallel to the neighboring blades 16 of the stator 12 (see arrow 73 of FIG. 4) is desirable for the following reason: As stated before, the blades in the working chamber of a hydrodynamic brake system are normally inclined with respect to the rotor axis. This is desirable in order to improve the output of the brake system. However, the inclination of blades with respect to the rotor axis often varies from brake system to brake system. If the portions of overflow line which are immediately adjacent to the ports 41, 42 extend in parallelism with the neighboring blades 16 of the stator 12, the flow conditions at the ends of the overflow line remain unchanged even if the angle of inclination of blades 15, 16 with respect to the axis 9 varies from one type of brake system to another type of brake system.

The structure shown in FIG. 3 exhibits the advantage that the rate at which the pressures to be "mixed" by the measuring device 40–44 deviate very pronouncedly from each other (in response to changes in RPM of the rotor 11). Consequently, the range within which the rate of changes of "mixed" pressure (in 37) can be varied is extremely wide. This is achieved by selecting the position of the port 41 in such a way that the intake end of this port faces the direction (arrow 70) in which the liquid circulates in the interior of the working chamber 10 so that the circulating liquid can flow directly into the line 40 (arrow 73) to effect a rather steep rise of liquid pressure upstream of the first flow restrictor 43. On the other hand, the port 42 acts not unlike an injector, i.e., the pressure of liquid in the line 40 downstream of the second flow restrictor 44 decreases in response to increasing speed of liquid circulation in the working chamber 10. It will be noted that, to this end, the port 42 discharges liquid (arrow 74) substantially in the direction (arrow 70) of liquid circulation in the chamber 10. When the braking action is constant while the RPM of the rotor 11 increases (i.e., when the extent to which the chamber 10 is filled decreases in response to increasing RPM of the rotor), the pressure in the port 42 decreases. This insures that the pressure of liquid in the control line 37 can be caused to decrease in response to increasing rotational speed of the rotor 11. The just outlined feature is especially important when the characteristic curve which is indicative of the progress of the braking action should slope upwardly in response to increasing RPM of the rotor.

The blades 15, 16 may be similar to those disclosed in U.S. Pat. No. 2,740,518 to Wilson.

Figure 2:
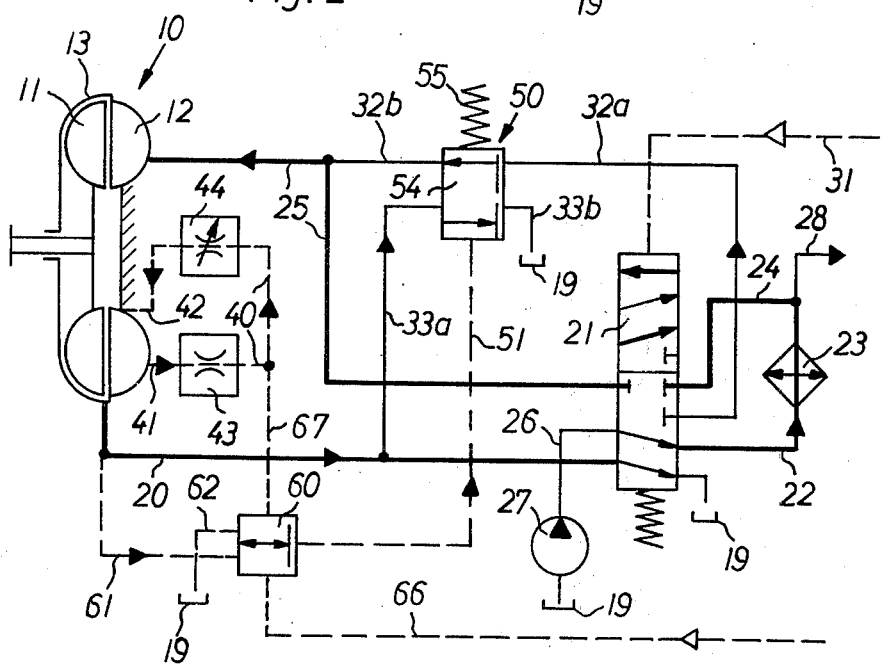
FIG. 2 is a similar partly sectional and partly diagrammatic view of a modified hydrodynamic brake system.

FIG. 2 shows a modified hydrodynamic brake system wherein the single regulating valve 30 of FIG. 1 is replaced by two discrete regulating valves 50 and 60. The valve 50 is installed in the conduits 32a, 32b and 33a, 33b to regulate the cross-sectional area of the passage wherein liquid can flow from the conduit portion 32a into the conduit portion 32b and of the passage wherein liquid can flow from the conduit portion 33a to the sump 19 via conduit portion 33b. The control line 36 of FIG. 1 is omitted, i.e, the spring 55 constitutes the only means for biasing the valve member or piston 54 of the valve 50 to a position in which the flow of liquid from the conduit portion 32a into the conduit portion 32b (and hence into the pipe 25 and chamber 10) takes place at a maximum rate while the piston 54 seals the conduit portions 33a, 33b from each other. The piston 54 can be moved upwardly, as viewed in FIG. 2, in response to increasing pressure of fluid in a control line 51 which connects the valve 50 with one outlet port of the valve 60. The fluid pressure in the control line 51 is determined by the valve 60 which has an inlet port connected with the pipe 20 by way of a line 61. A return line 62 connects a second outlet port of the valve 60 with the sump 19. The valve 60 has a valve member (e.g., a piston) which can be moved upwardly, as viewed in FIG. 2, in response to increasing pressure of fluid in a control line 66; such pressure is indicative of the desired braking moment. The valve member of the valve 60 can further be moved downwardly, as viewed in FIG. 2, in response to increasing pressure of fluid in the overflow line 40 (between the flow restrictors 43, 44) said pressure being admitted to the valve 60 by way of a control line 67 corresponding to the control line 37 of FIG. 1. The valve 60 is a pressure regulating valve which continously compares the pressure in the line 67 with the pressure in the line 66. When the pressure in the line 67 overcomes the pressure in the line 66, the valve member of valve 60 temporarily admits fluid from line 61 to line 51, whereby the fluid pressure in line 51 increases. Such an increase of pressure causes the valve member 54 to move upwardly until the pressure in the line 67 decreases sufficiently to match that in the line 66. Inversely when the pressure in the line 66 overcomes the pressure in the line 67, the valve member of valve 60 temporarily discharges fluid from line 51 to return line 62, whereby the fluid pressure in line 51 decreases.

Without further analysis, the foregoing will so fully reveal the gist of the present invention that others can, by applying current knowledge, readily adapt it for various applications without omitting features which fairly constitute essential characteristics of the generic and specific aspects of our contribution to the art and, therefore, such adaptations should and are intended to be comprehended within the meaning and range of equivalence of the claims.

What is claimed as new and desired to be protected by Letters Patent is set forth in the appended claims:

1. In a hydrodynamic brake system, a combination, comprising a stator; a rotor defining with said stator a substantially toroidal liquid-containing working chamber and being rotatable at a plurality of speeds; conduit means for supplying liquid to said chamber through a first port in said chamber and for evacuating liquid from said chamber through a second port in said chamber; adjustable regulating means for controlling the flow of liquid in said conduit means to thus determine the extent to which said chamber is filled with liquid and hence the braking torque of said system; and means for adjusting said regulating means, including a measuring device having an overflow line including a first end portion communicating through a third port in said chamber with a first portion of said chamber and a second end portion communicating through a fourth port in said chamber with a second portion of said chamber in such a way that a continuous stream of liquid flows in said line from said first to said second end portion thereof when said rotor rotates, and first and second flow restrictor means disposed in said line between said first and second end portions, the pressure of liquid in said line intermediate said flow restrictor means representing a first value which is indicative of the real braking torque of said system, said regulating means including means for comparing said first value with a rated value and for changing the quantity of liquid in said chamber when said first value deviates from said rated value.

2. A combination as defined in claim 1, wherein said liquid circulates in the first portion of said chamber in a first direction when said rotor rotates and the flow of liquid into said first end portion of said overflow line takes place in a second direction making with said first direction an angle of between 0° and 90°.

3. A combination as defined in claim 2, wherein said angle is between 45° and 75°.

4. A combination as defined in claim 1, wherein said liquid circulates in the second portion of said chamber in a first direction when said rotor rotates and the liquid issues from said second end portion of said overflow line in a second direction making with said first direction an angle of between 0° and 90°.

5. A combination as defined in claim 4, wherein said angle is between 5° and 30°.

6. A combination as defined in claim 1, wherein said stator has blades located in said chamber and being inclined with respect to the axis of said rotor, said third port being substantially parallel to one of said blades and said fourth port being substantially parallel to another of said blades.

7. A combination as defined in claim 1, wherein said means for comparing said first value with said rated value comprises a valve installed in said conduit means.

8. A combination as defined in claim 7, further comprising a cooling circuit for said liquid, said circuit including a first pipe which supplies cooled liquid into said chamber and a second pipe which evacuates heated liquid from said chamber, said conduit means comprising a first conduit which supplies liquid to said chamber via said first pipe and a second conduit which receives liquid from said chamber via said second pipe.

9. A combination as defined in claim 1, wherein said third and fourth ports are located at different distances from the axis of said rotor.

10. A combination as defined in claim 1, wherein said stator has blades which are located in said chamber and are inclined with respect to the axis of said rotor, each of said blades having a front surface along which the liquid flows in response to rotation of said rotor, said first end portion of said overflow line communicating with said working chamber through said third port adjacent to the front surface of one of said blades and said second end portion of said overflow line communicating with said chamber through said fourth port adjacent to the front surface of another of said blades.

* * * * *

UNITED STATES PATENT AND TRADEMARK OFFICE
CERTIFICATE OF CORRECTION

PATENT NO. : 3,989,127
DATED : November 2, 1976
INVENTOR(S) : Gerhard Staudenmaier et al.

It is certified that error appears in the above-identified patent and that said Letters Patent are hereby corrected as shown below:

In the heading, the name and address of the assignee should read -- Voith Getriebe KG, Heidenheim/Brenz, Germany --.

Signed and Sealed this

Tenth Day of May 1977

[SEAL]

*Attest:*

RUTH C. MASON
*Attesting Officer*

C. MARSHALL DANN
*Commissioner of Patents and Trademarks*